(12) United States Patent
Chiang

(10) Patent No.: US 7,670,089 B2
(45) Date of Patent: Mar. 2, 2010

(54) SIMPLE INCLINED-HOLE DRILLING JIG

(76) Inventor: Vance Chiang, 5F-2, No. 212, Sec. 1, Wunsin Rd., Taichung City (408) (TW)

( * ) Notice: Subject to any disclaimer, the term of this patent is extended or adjusted under 35 U.S.C. 154(b) by 519 days.

(21) Appl. No.: 11/702,409

(22) Filed: Feb. 6, 2007

(65) Prior Publication Data

US 2008/0187404 A1   Aug. 7, 2008

(51) Int. Cl.
*B23B 47/28* (2006.01)
(52) U.S. Cl. .................... 408/115 R; 408/97
(58) Field of Classification Search ............ 408/115 R, 408/241 B, 97, 103; *B23B 47/28*
See application file for complete search history.

(56) References Cited

U.S. PATENT DOCUMENTS

| | | | | |
|---|---|---|---|---|
| 1,128,970 | A * | 2/1915 | Godefroy et al. | 408/97 |
| 3,241,453 | A * | 3/1966 | Baldwin | 409/180 |
| 4,955,766 | A * | 9/1990 | Sommerfeld | 408/87 |
| 5,322,396 | A * | 6/1994 | Blacker | 408/72 R |
| 5,676,500 | A * | 10/1997 | Sommerfeld | 408/103 |
| 5,791,835 | A * | 8/1998 | Chiang et al. | 408/115 R |
| 5,807,036 | A * | 9/1998 | Lostlen | 408/97 |
| 6,254,320 | B1 * | 7/2001 | Weinstein et al. | 408/103 |
| 6,481,937 | B1 * | 11/2002 | Sommerfeld et al. | 408/115 R |
| 6,599,064 | B1 * | 7/2003 | Robinson | 408/110 |
| 6,637,988 | B1 * | 10/2003 | Park | 408/103 |
| D528,930 | S * | 9/2006 | Degen | D10/65 |
| 7,101,123 | B1 * | 9/2006 | Weinstein et al. | 408/103 |
| 2007/0201961 | A1 * | 8/2007 | Chiang | 408/115 R |
| 2008/0099101 | A1 * | 5/2008 | Chiang | 144/2.1 |
| 2008/0219786 | A1 * | 9/2008 | Sommerfeld et al. | 408/115 R |
| 2008/0226406 | A1 * | 9/2008 | Chiang | 408/115 R |

FOREIGN PATENT DOCUMENTS

EP    1595627 A2 * 11/2005

* cited by examiner

*Primary Examiner*—Eric A Gates

(57) ABSTRACT

A simple inclined-hole drilling jig comprises a jig body having a crossover plane at the bottom to evenly press against the wood workpiece, and a beveled end member at the front concavely disposed with a guiding shaft hole extending downwardly from the beveled end member through the crossover plane. The upper end of guiding shaft hole is configured with a guide bushing for drill bit to pass through. The rear end and side surfaces of jig body are respectively formed with a reference face and sidewalls perpendicular to the crossover plane; the sidewall is at least concavely disposed with a dust guide groove intercrossing the guiding shaft hole and slidingly disposed with a graduated extension board to allow axial displacement and positioning. The end of the extension board is bent to form a retaining end plane parallel to the reference face to extendingly adjust the axle spread of reference face.

6 Claims, 8 Drawing Sheets

SIMPLE INCLINED-HOLE DRILLING JIG

BACKGROUND OF THE INVENTION

1. Field of the Invention

The present invention relates to a woodwork drilling jig, more particularly, a simple inclined-hole drilling jig structure.

2. Description of the Related Art

Inclined-hole drilling of woodwork is primarily used in the corner joint of woodpieces. Conventional "simple inclined-hole drilling jig" (as shown in FIG. 8) designed for this kind of angle drilling comprises mainly of a jig body 1 having a crossover plane 2 able to evenly press against the wood workpiece at the bottom, and a beveled end member 3 at the front. The beveled end member 3 is concavely disposed with a guiding shaft hole 4, which extends downwardly from the beveled end member 3 through the crossover plane 2. The upper end of guiding shaft hole 4 is pivotally configured with a guide bushing 5 for drill bit to pass through. When the crossover plane 2 aligns the end of workpiece, the beveled angle design of the beveled end member 3 allows the center of drill bit to be directed at the thickness center of workpiece. However the actual operation requires precision marking and drilling, and the use of jig for oblique drilling, which is tedious and inconvenient. In addition, the guiding shaft hole 4 is concealed inside the drill jig which does not provide a good outlet for wood dust generated in the drilling. As a result of drill bit working under friction and pushing, the drilling quality is oftentimes poor.

SUMMARY OF THE INVENTION

The primary object of the present invention is to provide an improved simple inclined-hole drilling jig, which can rapidly adjust the axle spread of holes to be drilled without marking and drilling each hole, and the dust generated in the process of drilling can be removed smoothly, thereby greatly enhancing the drilling performance.

The improved simple inclined-hole drilling jig comprises a jig body having a crossover plane able to press evenly against the wood workpiece at its bottom and a beveled end member disposed at the front end of its long shaft. The beveled end member is at least concavely configured with a guiding shaft hole, which extends downwardly from the beveled end member through the crossover plane. The upper end of guiding shaft hole is pivotally configured with a guide bushing for drill bit to pass through. The rear end and side surfaces of the long shaft of jig body are respectively formed with a reference face and sidewalls perpendicular to the crossover plane, characterized in which the sidewall is at least concavely disposed with a dust guide groove intercrossing the guiding shaft hole, and is pivotally disposed with a graduated extension board in a manner that allows axial displacement and positioning. The end of the extension board is bent to form a retaining end plane parallel to the reference face to extendingly adjust the axle spread of reference face, thereby greatly enhancing the operating performance of the simple drill jig.

The objects, features and functions of the present invention are illustrated in detail below with a preferred embodiment and accompanying drawings.

DETAILED DESCRIPTION OF THE PREFERRED EMBODIMENT

Figure 1:
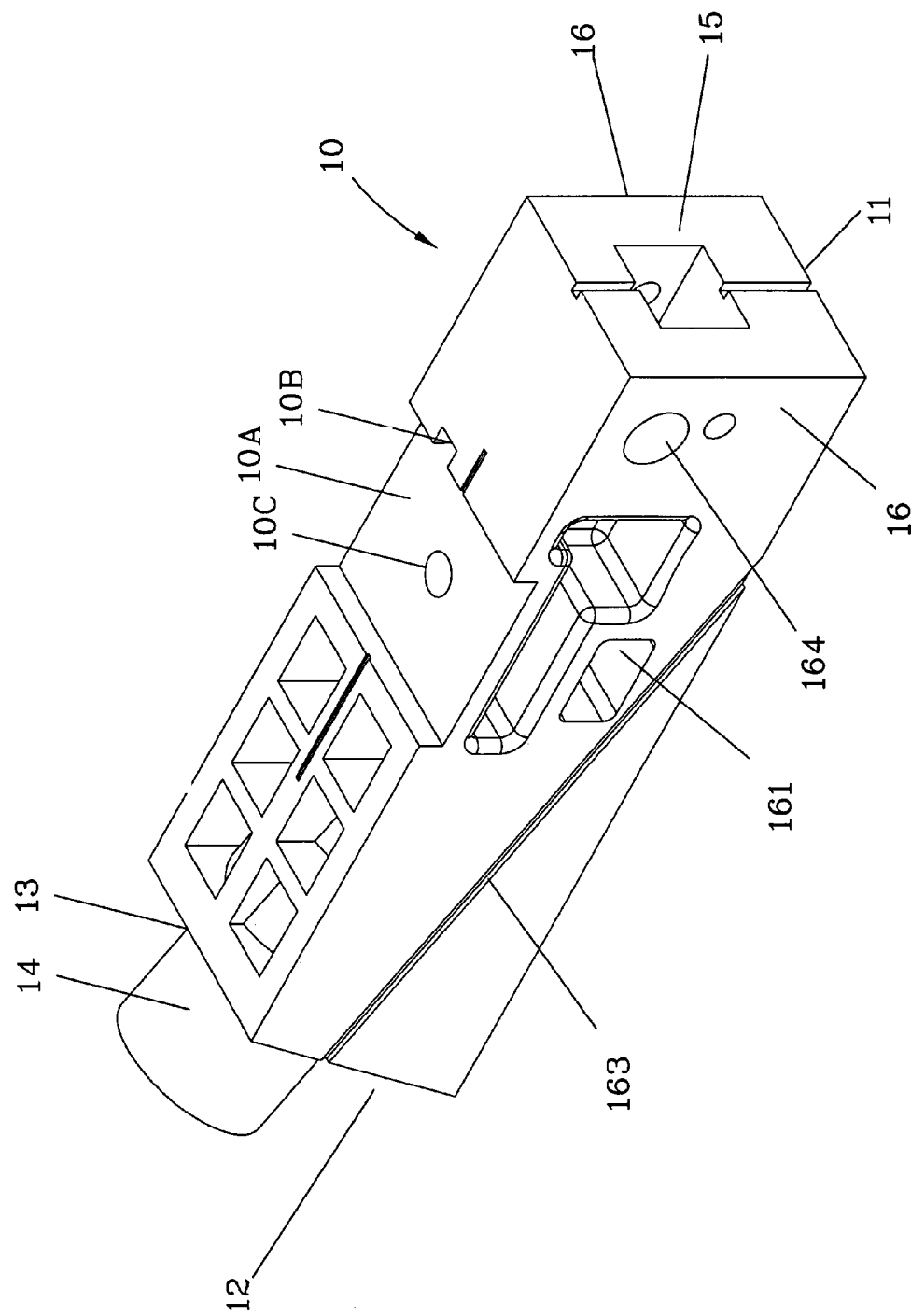
FIG. 1 is a perspective view of partially assembled drill jig body according to the invention.
Figure 4:
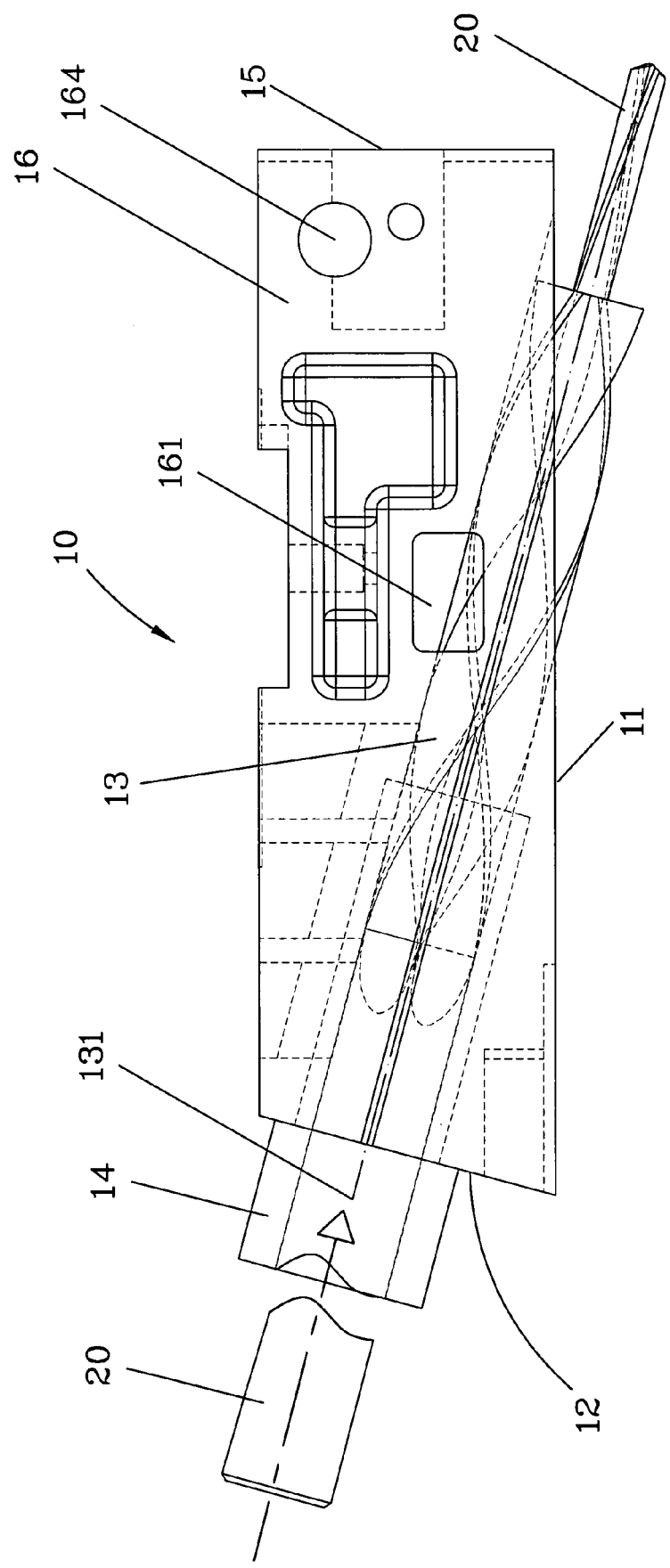
FIG. 4 is an action view of the invention performing inclined-hole drilling.

Referring to FIG. 1 and FIG. 4, the improved simple inclined-hole drilling jig of the invention comprises a jig body with a long shaft extension 10, having a crossover plane 11 able to evenly press against the wood workpiece at its bottom and a beveled end member 12 disposed at the front end of its long shaft. The beveled end member 12 is at least concavely configured with a guiding shaft hole 13, which, as shown in FIG. 4, extends downwardly from the beveled end member 13 through the crossover plane 11. The upper end of guiding shaft hole 13 is pivotally configured with a guide bushing 14 for drill bit 20 to pass through. The rear end and side surfaces of the long shaft of jig body 10 are respectively formed with a reference face 15 and two sidewalls 16 perpendicular to the crossover plane.

The sidewall 16 is concavely disposed with a dust guide groove 161, which, as shown in FIG. 4, has rectangular section axially perpendicular to the guiding shaft hole 13 and situated at a location preferably adjacent to the outlet at the bottom side of guiding shaft hole 13, and its bottom side communicates directly with the guiding shaft hole 13 so that wood dust would be drawn by the spiraling of drill bit 20 to exit early from the openings at both sides of dust guide groove 161.

Again referring to FIG. 1 and FIG. 4, the sidewalls 16 of the jig body 10 are respectively concavely disposed with an obliquely extending slot 163 symmetrical to each other and preferably corresponding to the axis of axle center 131 of guiding shaft hole 13.

Figure 2:
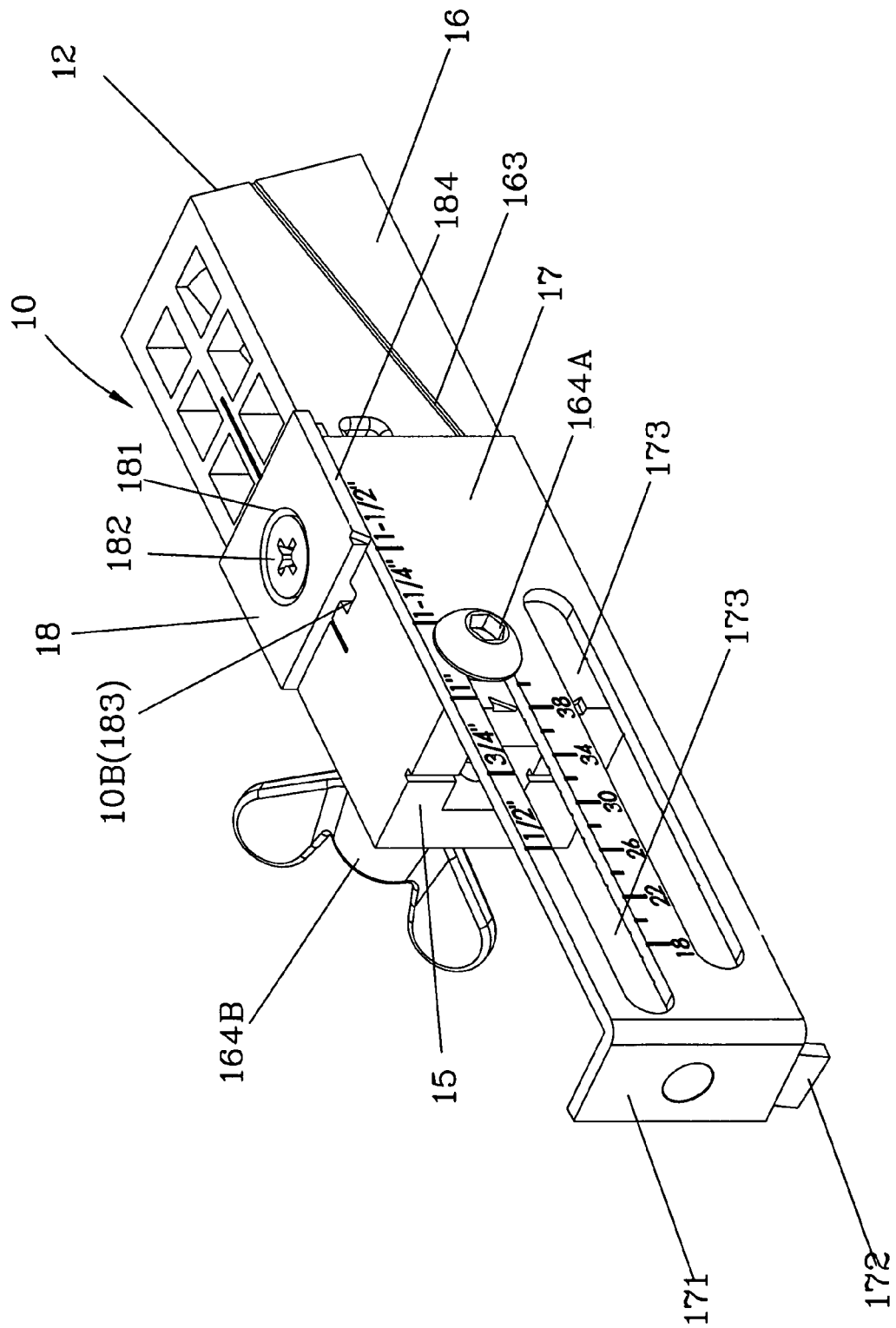
FIG. 2 is a front perspective view of an assembled drill jig body according to the invention.
Figure 3:
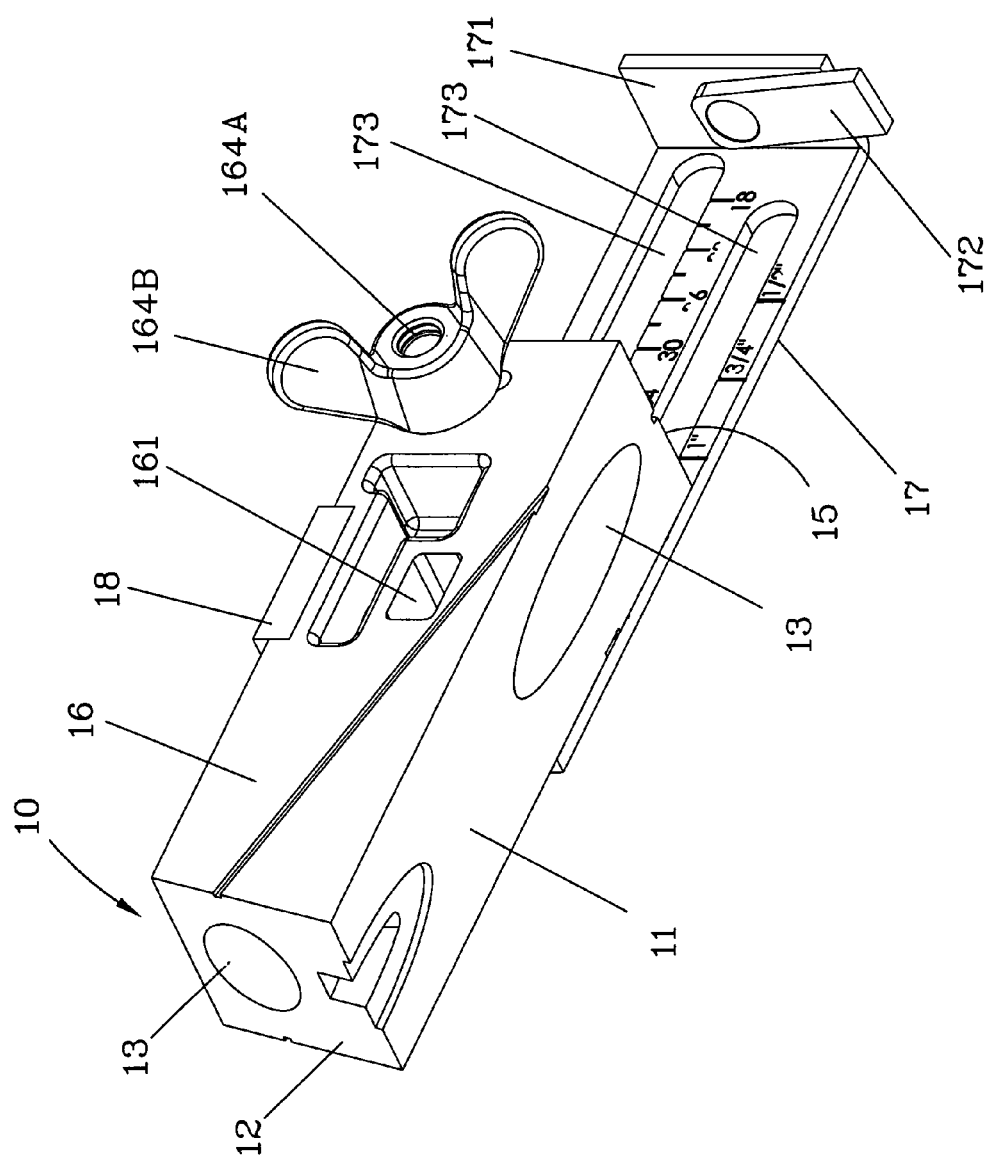
FIG. 3 is back perspective view of an assembled drill jig body according to the invention.

In addition, as shown in FIG. 1 and FIG. 4, the two sidewalls 16 have respectively a through pivot hole 164 concavely disposed at the corner nearing the reference face 15, which, coupled with a set of lock bolt 164A and nut 164B, secures an extension board 17. As shown in FIG. 2 and FIG. 3, the extension board 17 is a long board of predetermined length with a bent retaining end plane 171 parallel to the reference face. The inside of retaining end plane 171 is pivotally disposed with a retainer plate 172 of smaller area so as to provide another axle spread reference. The extension board 17 is concavely disposed along its long axis with an upper and lower sliding slot 173 parallel to each other. The parallel sliding slots are preset with metric and inch marks at upper margin and provide for the threading of lock bolt 164A and nut 164B to secure the extension board 17 evenly to the sidewall 16 and allow the extension board 17 to adjust axially by loosening the bolt 164A and nut 164B.

Referring to FIG. 1 and FIG. 2, the jig body 10 is concavely disposed at the top with a receiving recess 10A and a notch 10B nearby at the location corresponding to the dust guide groove 161. The receiving recess 10A is concavely disposed with a screw hole 10C. A pressed plate 18 is embeddedly disposed opposite the receiving recess 10A, which is concavely disposed with a through hole 181 at the center for the threading of a fixation screw 182 into the screw hole 10C. The side of pressed plate 18 at the location opposing the notch 10B is protrudingly disposed with a scarf-joint flange 183 to enhance the fastness of the pressed plate 18 to the receiving recess 10A, and form a limiting flange 184 transversely protruding from the thick top edge of extension board 17 to limit the top edge of extension board 17 disposed on sidewall 16.

Figure 5:
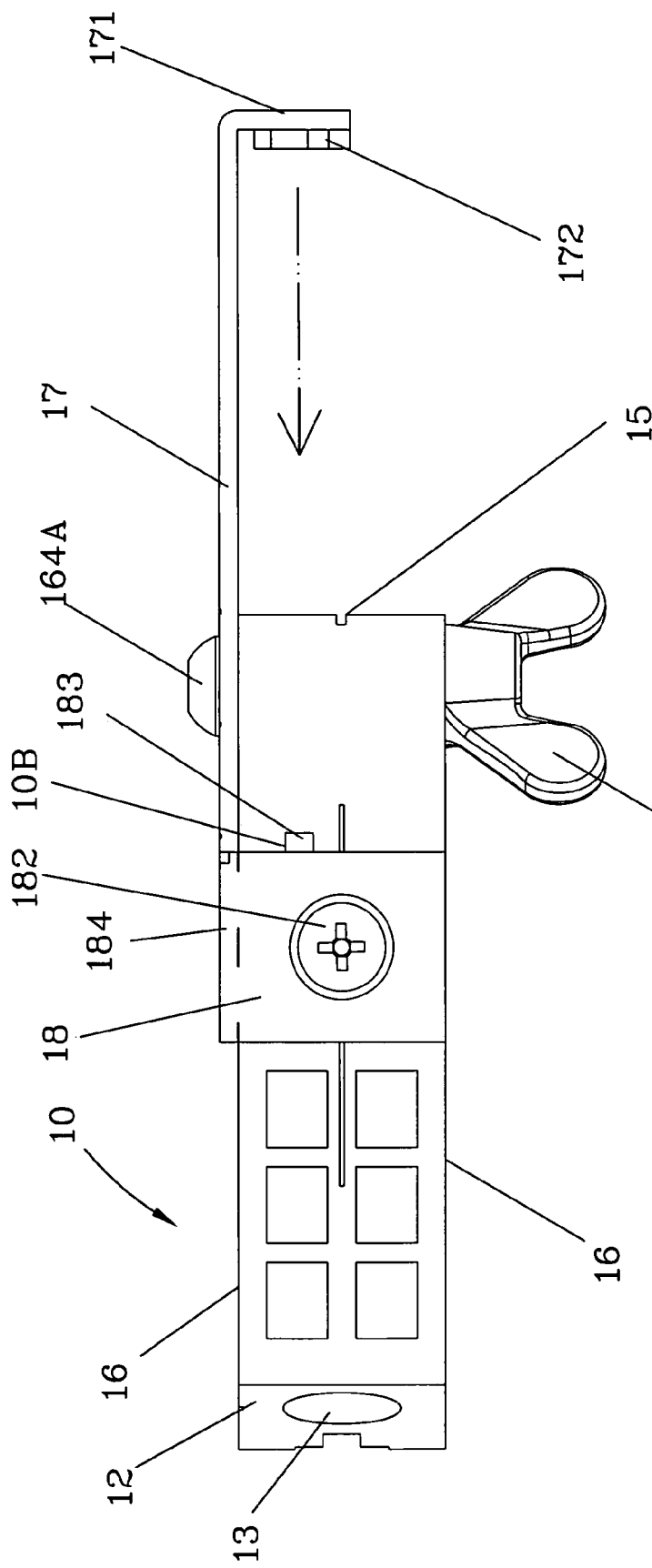
FIG. 5 is an action view of the invention performing axle spread adjustment.

The aforementioned assembly provides a simple inclined-hole drilling jig structure, which uses the crossover plane 11 at the bottom of jig body 10 to press against the wood workpiece evenly and the reference face 15 as reference support to engage in regular inclined-hole drilling. When there is need to drill workpieces of different thickness, the present invention employs the locking combination of extension board 17 and sidewall 16, and uses the loosening of bolt 164A and nut 164B to allow the axial adjustment of extension board 17 (see FIG. 5). With the metric and inch marks displayed at the upper margin of two parallel sliding slots 173, it allows rapid adjustment of drilling position without the hassle of additional measuring and marking.

Figure 6:
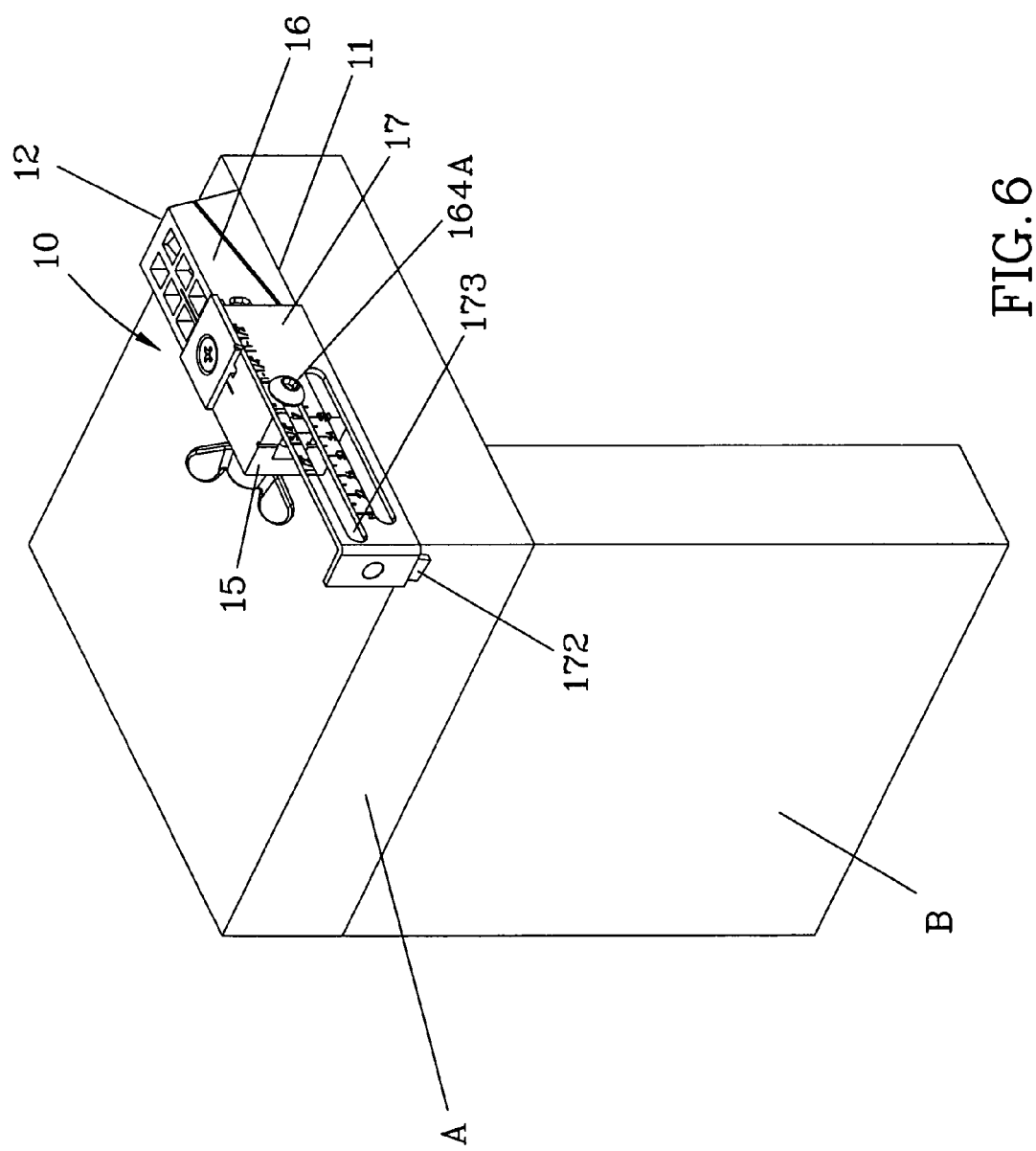
FIG. 6 is a view of the invention used in wood assembly.
Figure 7:
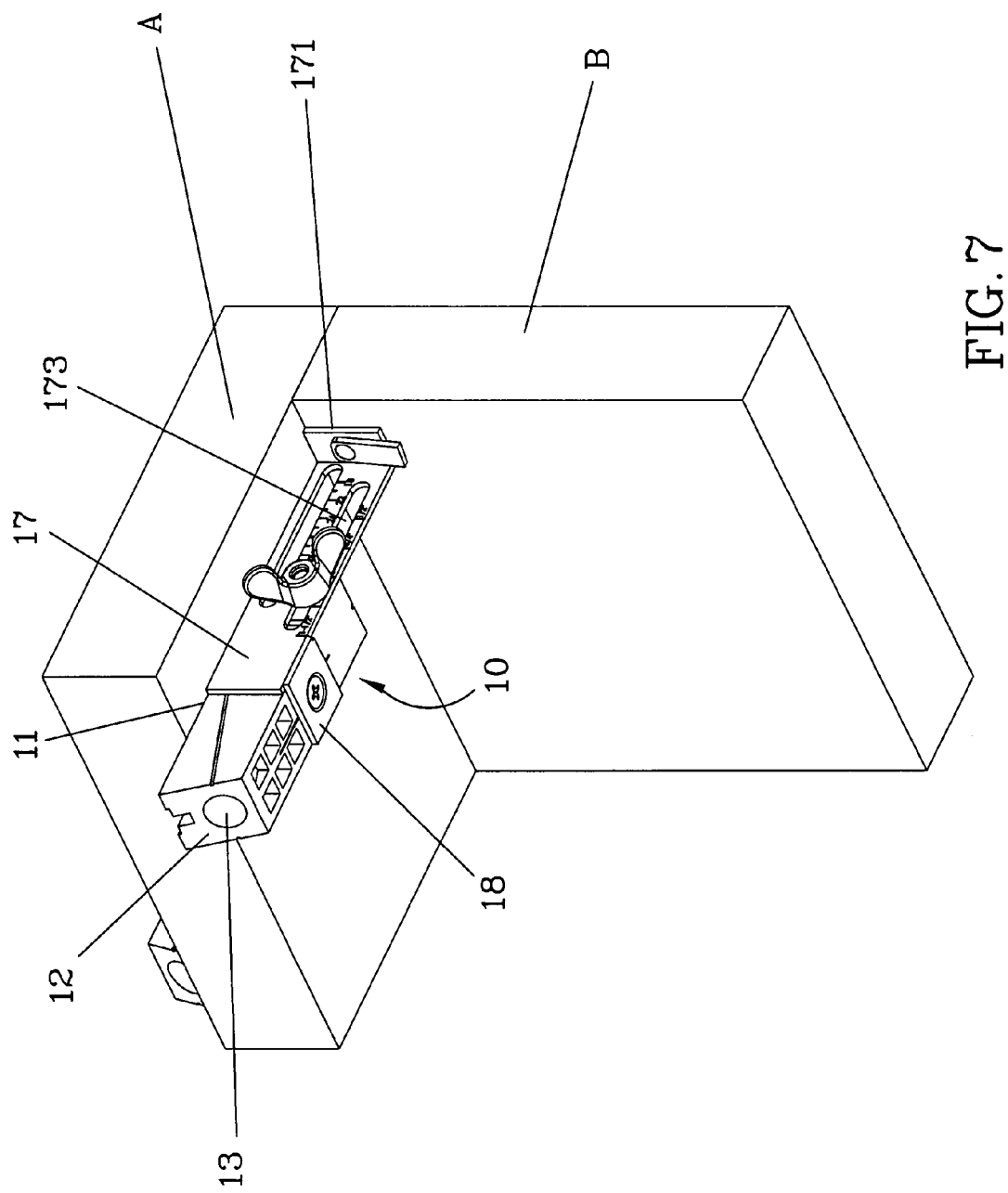
FIG. 7 is a view of the invention used in another wood assembly.
Figure 8:
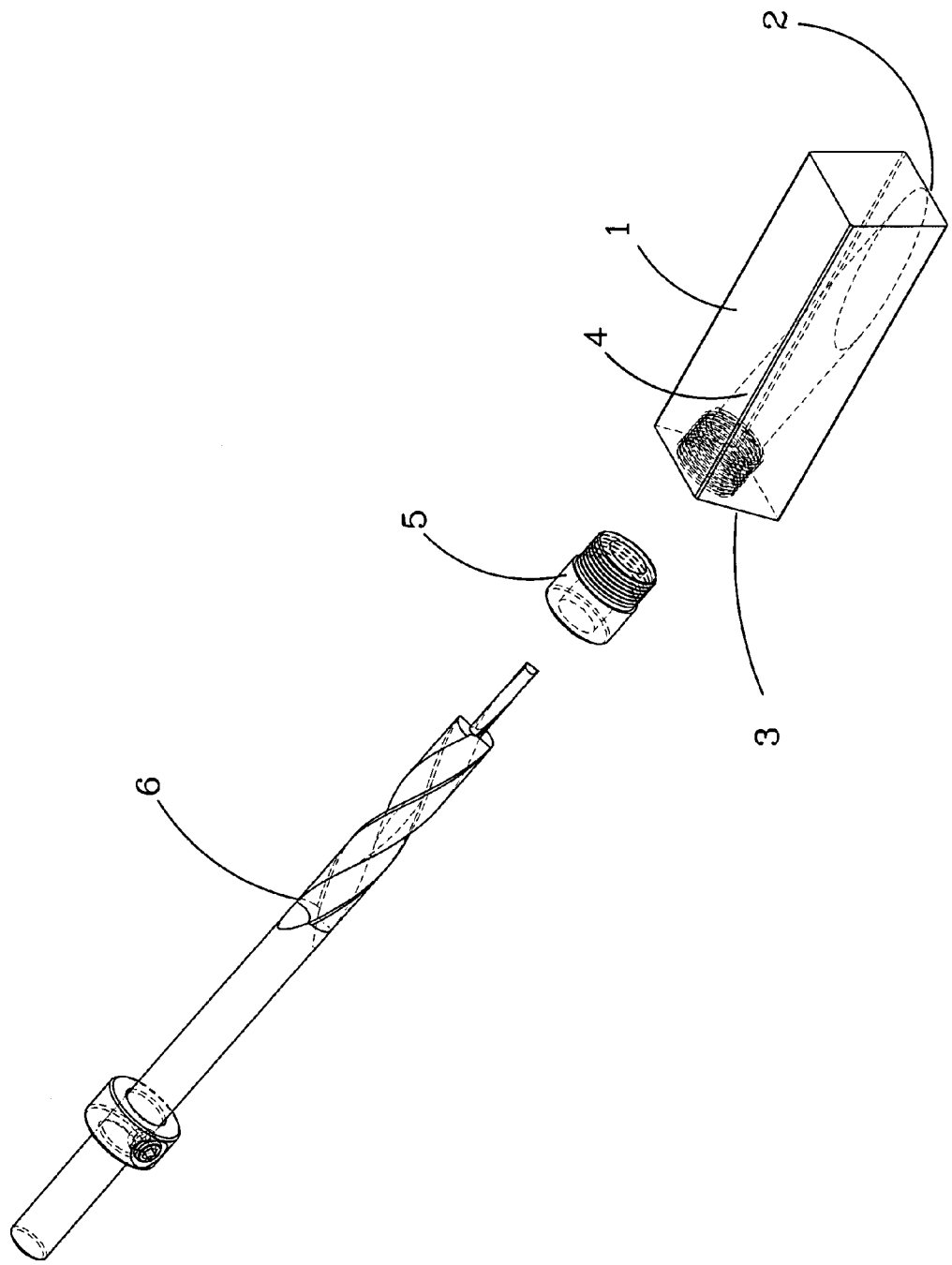
FIG. 8 is a view of a conventional drill jig body.

More particularly, aside from the bent retaining end plane 171 at the end of extension board 17 that provides reference for axle spread, the retainer plate 172 pivotally disposed at the inside of retaining end plane 171 also provides a reference support, thereby offering more options than prior art. For example, for the assembly of wood boards A and B as shown in FIG. 6, the crossover plane 11 is evenly fitted over the edge of board A and the retainer plate 172 pivotally disposed at the inside of retaining end plate hangs down to press against the edge of board A for inclined-hole drilling of desired spread. FIG. 7 shows another assembly of boards A and B to be drilled, in which, the crossover plane 11 is pressed evenly against the bottom side of board A, and at the same time, the outside of retaining end plane 171 is pressed tightly against board B to perform inclined-hole drilling with another, axial spread.

Regardless how the jig is positioned for inclined-hole drilling, the pressed plate 18, receiving recess 10A and notch 19B provide fast lock-in design. The limiting flange 184 transversely protruding from the thick top edge of extension board 17 limits the top edge of extension board 17 pivotally disposed at the sidewall 17 to render the axial displacement and adjustment of extension board 17 smooth and steady. More importantly, the design of dust guide groove 161 concavely disposed on the sidewall 16 communicates directly with the guiding shaft hole 13. Thus during drilling, the spiraling of drill bit works like a conveying belt to draw the wood dust to exit from the openings at both sides of dust guide groove 161, which will greatly enhance the drilling efficiency and ensure the good quality of inclined-hole drilling.

The invention claimed is:

1. An improved simple inclined-hole drilling jig, comprising a jig body with a long shaft extension having a crossover plane able to press evenly against the wood workpiece at its bottom and a beveled end member disposed at the front end of the long shaft; the beveled end member being at least concavely configured with a guiding shaft hole, which extends downwardly from the beveled end member through the crossover plane; the upper end of guiding shaft hole being slidingly configured with a guide bushing for a drill bit to pass through; the rear end and side surfaces of the jig body being respectively formed with a reference face and two sidewalls perpendicular to the crossover plane; characterized in which the sidewall is at least concavely disposed with a dust guide groove intercrossing the guiding shaft hole, and slidingly disposed with a graduated extension board in a manner that allows axial displacement and positioning; the end of the extension board is bent to form a retaining end plane parallel to the reference face to replace the reference face of the jig body and extendingly adjust the axle spread of the reference face, thereby greatly enhancing the operating performance of the simple drilling jig;

wherein the extension board is concavely disposed along its long axis with an upper and a lower sliding slot parallel to each other, which are preset with metric and inch marks at the upper margin; the two sidewalls of the jig body have respectively a through hole vertically and concavely disposed relative to the parallel sliding slots, which, coupled with a set of lock bolt and nut, secures the extension board;

wherein the inside of the bent retaining end plane at the end of the extension board is slidingly disposed with a retainer plate of smaller area to provide another axle spread reference.

2. The improved simple inclined-hole drilling jig according to claim 1, wherein the dust guide groove is preferably situated near the outlet at the bottom side of the guiding shaft hole.

3. The improved simple inclined-hole drilling jig according to claim 1, wherein the dust guide groove is preferably axially perpendicular to the guiding shaft hole.

4. The improved simple inclined-hole drilling jig according to claim 1, wherein a pressed plate is fixed on the top of the jig body to limit the top edge of the extension board which is slidingly disposed on the sidewall.

5. The improved simple inclined-hole drilling jig according to claim 1, wherein the two sidewalls of the jig body are respectively concavely disposed with an obliquely extending slot symmetrical to each other to facilitate the sliding adjustment of the extension board.

6. The improved simple inclined-hole drilling jig according to claim 1, wherein the dust guide groove has preferably a rectangular section and its bottom communicates directly with the obliquely extending guiding shaft hole so that wood dust is drawn by the spiraling of the drill bit to exit early from the opening at both sides of the dust guide groove.

* * * * *